United States Patent [19]

Fitch et al.

[11] 3,746,881
[45] July 17, 1973

[54] MARX GENERATOR AND TRIGGERING CIRCUITRY THEREFOR

[75] Inventors: Richard A. Fitch; Walter F. J. Crewson, both of La Jolla, Calif.

[73] Assignee: Maxwell Laboratories, Inc., San Diego, Calif.

[22] Filed: Feb. 16, 1971

[21] Appl. No.: 115,801

Related U.S. Application Data

[63] Continuation of Ser. No. 777,848, Nov. 21, 1968, abandoned.

[52] U.S. Cl.................. 307/110, 307/78, 307/108, 321/15
[51] Int. Cl........................ H02m 3/18, H02m 3/12
[58] Field of Search................ 307/110, 108, 106, 307/78; 321/15; 315/35, 36

[56] References Cited
UNITED STATES PATENTS

| | | | |
|---|---|---|---|
| 2,185,292 | 1/1940 | Candler | 307/110 UX |
| 2,405,069 | 7/1946 | Tonks | 307/108 X |
| 3,366,799 | 1/1968 | Fitch | 307/110 |

OTHER PUBLICATIONS

Frungel, High Speed Pulse Technology, 1965, Vol. 1, pages 131, 132, 133, 297, 298.

Primary Examiner—Bernard Konick
Assistant Examiner—Stuart Hecker
Attorney—Miketta, Glenny, Poms & Smith

[57] ABSTRACT

A compact working Marx generator consisting of a stacked plurality of chargeable capacitors and normally open switches between successive capacitors, and a second Marx generator, having a rapid self-erection rate, for triggering the closing of at least some of the switches at a rate substantially faster than the compact generator self-erection rate, necessarily slow because of its large interstage stray capacitance resulting from its compactness. The illustrated switches are spark gaps, each having a third electrode between its two principal electrodes, and the switches are closed by pulses fed thereto from successive stages of the triggering generator through isolating means such as inductors to minimize any effect of the firing of the switches on the erection of the triggering generator. One or more additional working generators may be paralleled with the first working generator, both as to their switch closing circuitries and their outputs. Because triggering of the working generator does not directly depend on the voltage of its capacitors, its output voltage may be varied over a wide range.

4 Claims, 4 Drawing Figures

INVENTORS.
RICHARD A. FITCH
WALTER F. J. CREWSON

Patented July 17, 1973     3,746,881

INVENTORS.
RICHARD A. FITCH
WALTER F. J. CREWSON
By
Miketta, Glenny, Poms & Smith
ATTORNEYS.

MARX GENERATOR AND TRIGGERING CIRCUITRY THEREFOR

This is a Continuation of Ser. No. 777,848, filed Nov. 21, 1968, now abandoned.

BACKGROUND OF THE INVENTION

The field of invention is that of high voltage, high current electrical pulse generators based upon the Marx principle, embodied in a device or generator for providing voltage multiplication in which, in general, a plurality of low voltage, precharged capacitors in stages are connected in series by switching means to give a single high voltage output and supply this high voltage output to a load. Typically, the low voltage stages include capacitors which are charged by suitable means well known in the art, and the switches which establish the series connection are spark gaps.

A voltage high enough to break down or ionize the air or other dielectric of the spark gap causes conduction across the spark gap and connects one charged capacitor in series with another. The process of connecting two or more charged capacitors in series constitutes erection of the generator.

In the field of Marx generators, economic and technological demands tend toward greater compactness and also higher output voltages and energies. Compactness leads to increased interstage capacitances within the generator, thereby increasing overall erection time of a generator, including a stack of capacitors separated by spark gap switches, if self-erection is relied upon. The resultant slow erection time is markedly disadvantageous in producing the maximum voltage to be supplied to a load, and too slow erection may permit internal flashover to ground and even destruction of the generator itself.

The length of life and reliability of operation of spark gap switches are adversely affected by too high current densities during conduction. Consequently, it is frequently desirable to operate a plurality of Marx generators in parallel so that the current density in each generator will not exceed some design value. But under these conditions difficulties are experienced in attempting to insure virtual simultaneous firing of the paralleled generators, and it is not unusual for the firing or erection of the first generator to effectively quench the incipient erection of other generators paralleled with the first.

SUMMARY OF THE INVENTION

The present invention relates to the generation of high voltages by erection of precharged capacitors upon each other so as to create an output which is the sum of the voltages of these capacitors. The apparatus used for erection of the precharged capacitors or stages of a major or working Marx generator includes a minor or triggering Marx generator having precharged stages which serve to trigger the stages of the major Marx generator. In general, each minor Marx stage provides triggering and erection of a major Marx stage upon another, and controls the specific major Marx stage so as to prevent random or inadvertent erection of the major Marx generator. However, a one for one minor to major Marx stage relationship is not necessary. One of the stages of the minor Marx generator is triggered by an external triggering source which initiates the erection of the minor Marx stages upon each other.

The basic principle involved is the use of transient voltages and currents erected within the stages of either the major or minor Marx generators to cause electrical conduction within a gap electrically separating the stages of each of the Marx generators. This occurs due to the over-voltage created by the transient current circulating within the minor Marx stage when triggered by the external source thereby adding the voltage of one stage of the minor Marx to another stage. If the stage carrying the transient current is operatively connected to a stage of a major Marx generator, then the voltage caused by the transient current will start conduction in a spark gap switch separating adjacent stages of the major Marx and thereby erect voltage of one such stage on that of the other. The same transiently caused voltage, fed through an impedance network, will similarly trigger a switch in a working generator paralleled with the first, virtually simultaneously with the first. Thus a Marx matrix can be made to provide not only voltage multiplication but also current multiplication to be supplied to a load.

Marx generators typically are capable of self-erection after one stage is fired or triggered by suitable means. The working generator or generators of the present invention also of course have this characteristic. However, the speed of self-erection of the working generator, if permitted, would be objectionably slow because of the comparatively large stray capacitances such as those associated with the spark gap switches. Since the triggering generator is characterized by smaller corresponding stray capacitances, its self-erection time is much more rapid, and the interconnections in accordance with the present invention permit the triggering generator to fully erect the working generator in substantially exactly the self-erection time of the former.

BRIEF DESCRIPTION OF THE DRAWINGS

FIG. 4 is a schematic showing of a plurality of multistage working Marx generators in accordance with the present invention.

DETAILED DESCRIPTION

Figure 1:
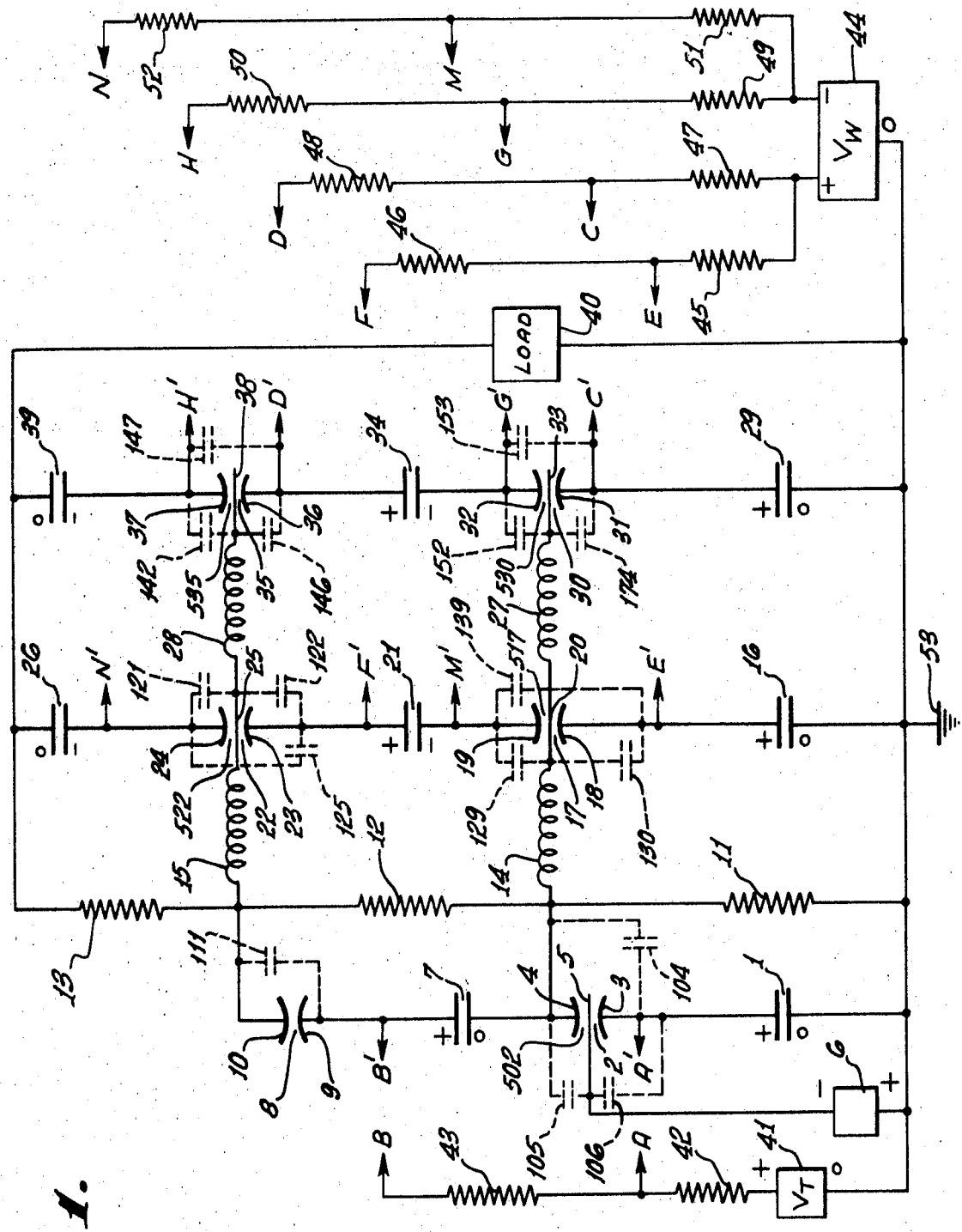
FIG. 1 is a schematic diagram of several major or working Marx generators triggered by a minor or triggering Marx generator in accordance with the invention.

Referring to FIG. 1, this invention represents the first practical realization of three extremely beneficial features of Marx generator operation. These are: (1) rapid generator erection; and (2) simultaneous operation of an unlimited number of parallel switches at each stage of the generator and (3) generator operation over an arbitrarily wide voltage range. Previously, wide operating voltage ranges have only been obtained at the expense of long erection time and only with a single switch per stage. Conversely, rapid erection has been obtainable but only through sacrifice of the desirable wide operating voltage range, and once again only with a single switch per stage. Operation of parallel switches between Marx generator stages has never been attained previously.

In the Marx generator which is the subject of this invention, fast erection is provided by a small low-energy triggering Marx generator, which is designed along relatively conventional lines to provide fast operation at a fixed operating voltage. A single switch per stage is used in this triggering Marx generator. This generator is used to provide positive triggering of many, preferably all stages of a large, high-energy, compact Marx generator, referred to herein as a working generator. The method of interconnecting the triggering and working generators causes the working generator to erect at virtually the same speed as the triggering generator, and the successive positive, high-amplitude triggering voltage pulses provided to the switches of the working generator by the triggering generator are used to obtain very rapid erection of the former over a very wide range of operating voltages in the working generator.

The composite generator circuit is illustrated in FIG. 1. Polarities of all potentials shown can be reversed without loss of generality. The circuits can be extended repetitively upward and to the right into an arbitrarily large number of vertical columns and horizontal rows, as described later in connection with FIG. 4. Enough of the circuit matrix is shown to permit a description of the first two cycles of generator operation in each direction. Operation of further vertical and/or horizontal additions to this circuit follows the pattern established by the operation of the circuits in FIG. 1.

The potentials on capacitors 1 and 7 are established by means of DC power supply 41 and charging resistor network 42 and 43. The circuit including capacitors 1 and 7 and spark gaps 2 and 8 is the minor or triggering Marx generator for the major or working Marx generators. The major Marx generators include capacitors 16, 21, 26, 29, 34 and 39 and spark gaps and components 17, 517, 22, 522, 30, 530, and 35, 535. The static potentials impressed on the capacitors of the major Marx generators are supplied by power supply 44 and charging resistor network 45, 46, 47, 48, 49, 50, 51 and 52. When the appropriate potentials $V_T$ and $V_W$ have been established on the generator capacitors, the system is ready to be discharged.

To start the generator discharge process, the operator actuates pulse generator 6. This generator applies a negative high voltage pulse (all potentials are referenced to the circuit point indicated by 53, which will be called "ground" potential) to trigger electrode 5 of a three-electrode spark gap. Prior to application of this pulse, trigger electrode 5 has been held at a DC potential having a value in the range between 0 and $+V_T$.

Application of a negative pulse to electrode 5 acts to reduce the electric field in component gap 502 and to increase the electric field in component gap 2. Component gap 2 will break down when the electric field or voltage gradient in its exceeds the intrinsic breakdown or sparkover strength of the dielectric. When this gap closes, stray capacitance 106, generally not larger than a few picofarads, rapidly discharges and the potential of electrode 5 rises to that of electrode 3, namely $+V_T$. This condition is established rapidly, since stray capacitor 106 can discharge quickly, being quite low in value, and stray capacitor 105 can be charged quickly through the resistance of the plasma channel present in spark gap 2. Stray capacitor 105 is also not larger than a few picofarads. This condition causes the full potential $V_T$ to exist across spark gap component 502, since stray capacitor 104 (generally a few tens of picofarads) is sufficiently large to clamp the total potential difference between electrodes 3 and 4 at the value $V_T$.

The electric stress in spark gap component 502 has now increased, and the spark gap is designed to break down under this amount of increased stress. This breakdown process proceeds slightly more slowly than did the breakdown of spark gap component 2, since the larger stray capacitor 104 must now be discharged through the series combination of spark gap components 502 and 2. However, this breakdown is still quite rapid since stray capacitors 104, 105 and 106 are all in the low picofarad range, and hence store only a trivial energy even at a potential of several tens of kilovolts. When the breakdown of spark gap components 2 and 502 has been effected in this way, the potential of electrode 4 rises from 0 to $+V_T$. This change in potential is transmitted to the two-electrode spark gap 8 consisting of two electrodes 9 and 10, by capacitor 7. Spark gap electrode 9 changes in potential from $+V_T$ to $2V_T$ as a result. Stray capacitor 111, not generally larger than a few picofarads, would force switch electrode 10 to follow the change of potential of switch electrode 9 except that switch electrode 10 is referenced to ground potential through an impedance here illustratively shown as inductor 15. Electrodes 25 and 38 are held at ground potential by the parallel combination of stray capacitors 121, 122 and 142, 146, respectively, referred back through capacitors 21, 139 and 16, and 34, 153 and 29, respectively. Stray capacitor 111, much smaller in capacitance than the parallel combination of 121, 122, 142 and 146, discharges rapidly through this path to ground, and switch electrode 10 remains very near its original ground potential. Consequently, the voltage drop across spark gap 8 nearly doubles. Spark gap 8 is designed to break down at a voltage between $V_T$ and $2V_T$, and does so rapidly.

While spark gap 8 has been breaking down, the sudden change of potential of switch electrode 4 has been forcing current to flow through impedance such as inductor 14 to change the potential of stray capacitors 129, 130 and 152, 174. Since the parallel combination of these stray capacitances is significantly larger than stray capacitance 111, it has been possible to change the potential on capacitor 111 and break down component gap 8 before the potentials on switch electrodes 20 and 33 have changed sufficiently to break down their associated component gaps. It will be remembered that the potential of electrode 4 rose from 0 to $+V_T$ when the three electrode spark gap 2-502 broke down. A series LC resonant circuit is now formed composed of capacitor 1, inductor 14 and small stray capacitors 129 and 130, which are effectively in parallel due to the presence of larger stray capacitor 139 and capacitor 16. Capacitor 1 is chosen to have a value much larger than the parallel combination of stray capacitors 129, 130 and 152, 174. Consequently, the potentials of both electrodes 20 and 33 are driven from 0 toward a peak value of $+2V_T$. This action tends to increase the stress in component gaps 517 and 530, and to decrease the stress in component gaps 17 and 30. The half-period of this sinusoidal oscillation can easily be made as short as a few tens of nanoseconds. Component gaps 517 and 530 are designed to withstand the DC potential $V_W$, but to break down at a potential less than $2V_W$. Potential $V_T$ is chosen at least as large (preferably larger) than $V_W$, so that component gaps 517 and 530 will break down before the potentials of electrodes 20 and 33 reach their peak oscillatory value. When these breakdowns have discharged stray capacitors 129 and 152 respectively, the full potential $2V_W$ is impressed on spark gaps 17 and 30, causing them to begin to break down.

Because the major or working Marx generator is compact, stray capacitances 139 and 153 are quite large in comparison to stray capacitances 104 and 111 for example. This results from the fact that capacitors 16 and 21 and capacitors 29 and 34 are in close physical proximity to each other. Capacitors 1 and 7, by contrast, are physically smaller units and can be separated more widely. Since stray capacitors 139 and 153 are relatively large, the breakdown time of component gaps 17 and 30 will be somewhat larger than the breakdown time of component gap 502 and spark gap 8. This provides another mechanism to allow the triggering Marx generator to erect more quickly than the working Marx generator, which is essential for good circuit operation as will be seen.

When the three-electrode spark gaps 17-517 and 30-350 have completely broken down, the potentials of spark gap electrodes 23 and 36 rise from their DC values of $+V_W$ to $+3V_W$. Capacitors 16 and 21 and capacitors 29 and 34 are now connected in series, constituting the erection of one stage of the major Marx generator with parallel switching. While the first two spark gaps in the major Marx generator were in the process of breaking down, the two immediately above them were also being broken down by the action of the minor Marx generator which erected a short time previous to this. Trigger electrodes 25 and 38 were driven from their DC zero potential values toward $4V_W$, causing rapid breakdown of spark gaps 522 and 535. The presence of large stray capacitors 125 and 147 then impressed the full voltage $2V_W$ across component gaps 22 and 35, causing them to break down and discharge stray capacitors 125 and 147.

If the major and minor Marx generators are extended in the vertical direction, it is a straightforward matter to choose optimum values of minor Marx capacitors and coupling impedances to permit the minor Marx generator to erect somewhat more rapidly than the major Marx generator can erect, yet still discharge the minor Marx generator capacitances sufficiently rapidly into those of the major Marx generator so that the difference in speed between the minor and major Marx generators does not cause the accumulation of a large relative horizontal potential difference between these two Marx generators with a resulting electrical breakdown in one of the coupling impedances. A model comprised of five vertical major Marx columns each 30 stages in height has been constructed using the circuit of FIG. 1 or 4. This model consistently displays complete and proper breakdown of all 150 major Marx switches, and the erection time of the major Marx is very nearly equal to that of the minor Marx. The fact that the minor Marx controls the erection time of the major Marx has been shown by disconnecting the minor Marx from the circuit. The major Marx will still erect reliably in a multichannel fashion (all 150 switches completely broken down) but its rate of erection in this case is less than one tenth of the rate observed when triggered by the minor Marx. The voltage range throughout which perfect circuit operation can be obtained on each trial is approximately 6:1 (from $V_W$ to $1/6V_W$).

In summary, it has been found that a requirement for compactness in a Marx generator leads inevitably to large stray capacitances in parallel with the switches of the Marx generator. These stray capacitances tend to fix the potential difference between electrodes of the Marx generator switches. This renders a compact Marx generator difficult to errect, since the switches are difficult to over-stress. Consequently, three-electrode switches have been introduced into the compact Marx generator since the stray capacitance from the trigger electrode of the three-electrode switch to its adjacent switch electrodes is significantly smaller than the large shunt stray capacitance across the entire switch. To prevent the breakdown of a given switch in the compact Marx generator from removing the potential from adjacent parallel switches on the same level, the compact Marx may be thought of as having been subdivided into many virtually independent vertical columns. Since this sub-division process can be continued indefinitely, high energy load requirements can be met by paralleling a number of working generators, so that no switch in the major Marx generator will be forced to transfer more electric charge or carry more peak discharge current than its electrode materials can tolerate. Long lifetime, low probability of spontaneous breakdown and overall high reliability can therefore be obtained from this switch to whatever extent is desired by the Marx generator designer. The trigger electrodes of all switches at a given level in the Marx generator are rendered independent of each other for short time intervals by the insertion of isolating impedances such as inductors 14, 15, 27, 28 or by the alternative arrangement of corresponding impedance networks shown and illustrated in FIG. 4. This assures non-interference between the breakdown process in one switch and that in its neighbors. However, all switches at a given level are virtually simultaneously triggered by connecting the isolating impedances such as the inductors just mentioned to a common trigger signal line. Extremely rapid overvolting of all switches in the major Marx is assured by choosing element values that allow the minor Marx to erect more rapidly than the major Marx, and a wide overall voltage range is assured by fixing the charging potential on the minor Marx (hence fixing the trigger pulse amplitude delivered to the major Marx) while allowing independent variation of the charging potential of the major Marx generator capacitors.

TRANSIENT RESPONSE OF THE MARX GENERATOR MATRIX.

Figure 2:
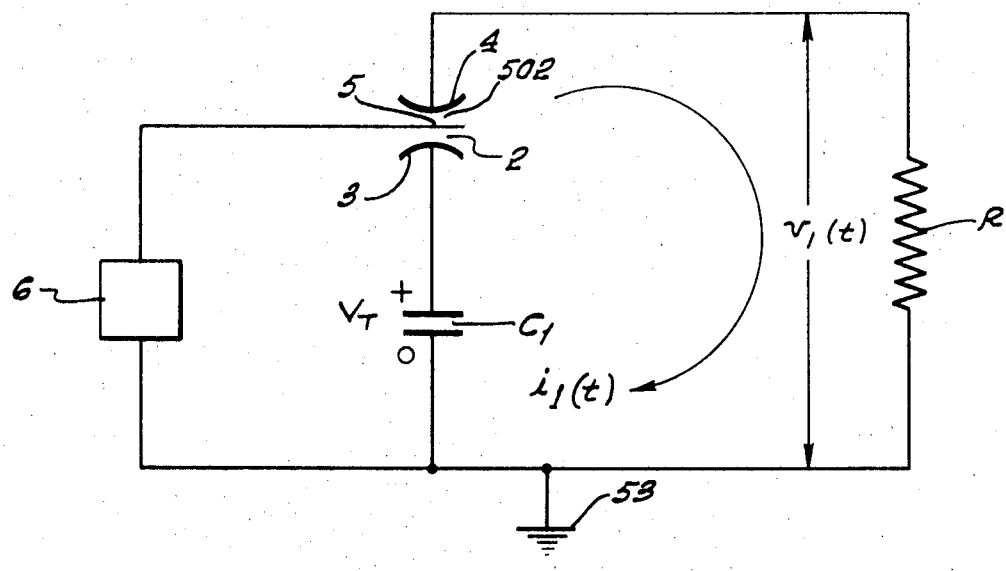
FIG. 2 is an equivalent schematic of a portion of FIG. 1, to be referred to in connection with the transient analysis of a minor Marx current.
Figure 3:
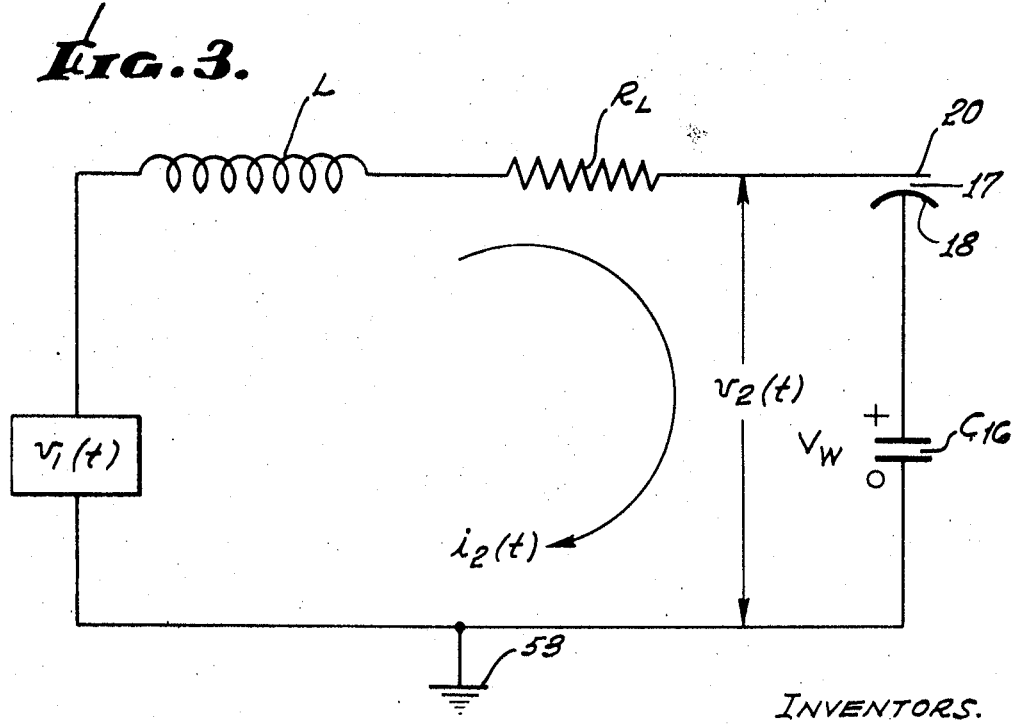
FIG. 3 is an equivalent schematic of a portion of FIG. 1, to be referred to in connection with the transient analysis of a major Marx circuit.

Referring to FIGS. 1, 2 and 3 equivalent circuits of a portion of FIG. 1 are shown as FIGS. 2 and 3. An equivalent circuit of charged capacitor 1, spark gap 2-502, trigger source 6 and resistor 11, we obtain FIG. 2 schematically which is used to determine the breakdown conditions of spark gap 2, and the buildup of voltage $v_1(t)$.

In FIG. 2, to assist computations through use of symbolic form, capacitor 1 is referred to as $C_1$ and resistor 11 as R.

Voltage $V_T$ across precharged capacitor $C_1$ is of such level as not to break down component spark gap 2. Additional voltage provided by trigger source 6 when this trigger source is activated overvolts component gap 2 and causes it to break down. The voltage $V_T$ appears across component gap 502 causing it to break down. Gap electrode 4 is initially at zero potential in view of the potential of the lower plate of capacitor 7 of FIG. 1, and gap electrode 3 is initially at $V_T$ potential in view of the upper plate potential of capacitor 1. The trigger pulse of trigger source 6 may be of such sense that it adds to the voltage $V_T$ of capacitor 1 to break down component gap 2 and cause conduction between trigger electrode 5 and gap electrode 3. Once conduction starts, in component gap 2, the other portion will conduct, hence total gap ionization takes place and conduction between gap electrodes 3 and 4 will occur, thereby erecting the voltage of capacitor 7 upon the voltage of capacitor 1. The breakdown action of gap 2-502 acts the same as closing a switch to start an electrical current flowing, and the transient current ensuing is expressed as:

$$i_1(t) = (V_t/R) e^{-(t/RC_1)} \tag{1}$$

The voltage developed across resistor R will therefore be responsive to the current $i_1(t)$, therefore:

$$v_1(t) = V_T e^{-(t/RC_1)} \tag{2}$$

Referring to FIG. 3, the equivalent circuit of the major Marx generator is shown energized by $v_1(t)$, which is the forcing function developed by the minor Marx generator. This forcing function provides the trigger signal for a stage of the major Marx generator. Here again for ease of computation, the inductance 14 and capacitance 16 are respectively referred to as L and $C_{16}$. Additionally, it must be remembered that the wiring of this circuit, as well as the inductance in the circuit, have a small value of resistance which will hereinafter be referred to cumulatively as $R_L$. Current $i_2(t)$ will not flow until breakdown of component gap 17 occurs between electrode 18 and trigger element 20. Prior to this breakdown, trigger element 20 will be the same potential as $v_1(t)$. The appearance of transient voltage $v_1(t)$ at 20 will increase the potential difference between trigger element 20 and electrode 18 and therefore cause breakdown between trigger 20 and electrode 18, thereby starting current $i_2(t)$ flowing. The mathematical relationships established will be:

$$V_T e^{-(t/RC_1)} = L(di_2/dt) + R_L i_2 + (1/C_{16})\int i_2 dt + (q/C_{16}) \tag{3}$$

but $q = C_{16} V_W$,
therefore, $(q/C_{16}) = V_W$ (4)

Hence, substituting equations 4 into 3, we obtain:

$$V_T e^{-(t/RC_1)} = L(di_2/dt) + R_L i_2 + (1/C_{16})\int i_2 dt + V_W \tag{5}$$

Shifting $V_W$ to the left side of the equation, we obtain:

$$V_T e^{-(t/RC_1)} - V_W = L(di_2/dt) + R_L i_2 + (1/C_{16})\int i_2 dt \tag{6}$$

The solution of equation 6 is best obtained utilizing Laplace transformations, hence we obtain:

$$\frac{V_T}{s + \frac{1}{RC_1}} - \frac{V_W}{s} = \left(Ls + R_L + \frac{1}{C_{16}s}\right) I_2(s) \tag{7}$$

where $I_2(s)$ is the Laplace transformation of $i_2(t)$. Solving equation 7 for $I_2(s)$, we obtain:

$$I_2(s) = \frac{V_T s - V_W \left(s + \frac{1}{RC_1}\right)}{s\left(s + \frac{1}{RC_1}\right)\left(Ls + R_L + \frac{1}{C_{16}s}\right)} \tag{8}$$

$$= \frac{V_T s - V_W s - \frac{V_W}{RC_1}}{L\left(s + \frac{1}{RC_1}\right)\left(s^2 + \frac{R_L}{L}s + \frac{1}{LC_{16}}\right)} \tag{9}$$

Finding the roots of the quadratic of the denominator of equation 9, this equation becomes:

$$I_2(s) = \frac{(V_T - V_W)s - \frac{V_W}{RC_1}}{L\left(s + \frac{1}{RC_1}\right)\left(s + \frac{R}{2L} \pm \sqrt{\frac{R_L^2}{4L^2} - \frac{1}{LC_{16}}}\right)} \tag{10}$$

Three solutions to equation 11 are possible. First, the critical condition, when $R_L^2/4L^2 = 1/LC_{16}$. In this condition, the radical disappears and the solution of $I_2(s)$ in the time domain, being $i_2(t)$, will yield an expression having two exponential terms with negative exponents. Second, the overdamped condition, where $R_L^2/4L^2$ is greater than $1/LC_{16}$. This will result in an expression in $i_2(t)$ having three exponential terms with negative exponents. Third, when $R_L^2/4L^2$ is smaller than $1/LC_{16}$. This will result in an expression in $i_2(t)$ of one exponential term with a negative exponent plus a second term comprising another exponential term with a negative exponent multiplied by a transcendental function.

The third condition is the desired condition, inasmuch as this results in a product of two functions, the magnitude of which is sufficient to increase the charge of storage capacitor $C_{16}$ and sustain conduction in gap 17-517 thereby adding the voltage across capacitor $C_{16}$ to the voltage across capacitor 21. This adding of voltages is referred to as voltage or stage erection.

The solution of equation 16 for the third and desired condition will be of the form of:

$$i_2(t) = K_1 e^{-(t/RC_1)} + K_2 e^{-R/2L t} \cos(\beta t + \phi)$$

Equation (11) is the inverse Laplace transform of equation (10), and $K_1$ and $K_2$ are coefficients, $\beta$ is approximately $1/\sqrt{LC_{16}}$ and $\phi$ is a constant phase angle, and where the above parameters depend upon the voltages $V_T$, $V_W$, and the values of $L$, $R$, $L_R$, $C_1$ and $C_{16}$.

Hence the voltage between trigger 20 and electrode 18 as shown in FIG. 3 is $$v_2(t) = (1/C_{16})\int i_2(t)dt = (1/C_{16})\int [K_1 e^{-(t/RC_1)} + K_2 e^{-(R/2L)t}\cos(\beta t + \phi)]dt \tag{12}$$

Voltage $v_2(t)$ is a large transient voltage which has a peak value when current $i_2(t)$ just begins to flow through component gap 17 between trigger element 20 and electrode 18. This larger voltage when evaluated at the time current $i_2(t)$ just begins to flow, breaks down component gap 517, causing high conduction within this component gap and between gap electrodes 18 and 19 thereby erecting the voltage of capacitor 21 on top of the voltage of capacitor 16 of FIG. 1. Capacitor 21 having been charged to voltage $2V_W$ due to the negative and positive potential applied by power source 44 thereto, will erect upon the voltage of $V_W$ of capacitor 16, thereby providing a total potential difference between electrode 23 of gap 22 and trigger electrode 25 of $3V_W$.

But prior to the aforesaid erection of capacitor 16 voltage upon capacitor 21 voltage, erection of the voltage $V_T$ of capacitor 7 upon the voltage of $V_T$ of capacitor 1 has occurred, thereby providing a potential difference between electrode 9 of gap 8 and ground 53 of $2V_T$. This will provide a potential of $2V_T$ across gap 8 electrodes inasmuch as electrode 10 is at ground potential by virtue of connection of resistors 12 and 11 between electrode 10 and ground 53. Since gap 8 cannot withstand a potential difference of $2V_T$, the gap will break down and conduction in gap 8 will occur providing a potential of $2V_T$ at the juncture of resistors 12 and 13.

As discussed hereinabove, transient current of the form shown in equation 1 will flow and a voltage of the form shown in equation 2 will develop across resistor 12 thereby causing a potential at trigger element 25 to exist of the same magnitude as the voltage developed across resistor 11. As hereinabove described in conjunction with component gap 17, a transient current of the form shown in equation 11 will begin to flow between trigger element 25 and electrode 23 of gap 22. This transient current is sufficiently large so that the voltage produced by this transient current will also break down component gap 522 completely and cause conduction between electrodes 23 and 24, thereby erecting the voltage $V_W$ of capacitor 26 upon the previously erected voltage $3V_W$ for a total of $4V_W$ across load 40.

Similar to the manner in which the voltages of capacitors 16, 21 and 26, were erected upon each other, by means of the transient currents as exemplified by the expression of current of equation 11 and the transient voltages as exemplified by the voltage expression of equation 12, transient currents and corresponding transient voltages will act upon gaps 30-530 and 35-535. The transient currents will flow through inductors 27 and 28 respectively, forced thereabove by the transient voltages upon trigger elements 20 and 25, as hereinabove described, which were developed in the process of erecting the voltages of capacitors 16, 21, and 26.

Hence, the transient voltage developed between trigger electrode 33 and gap electrode 31 will provide the required potential difference therebetween for breakdown of component gap 30. Again once conduction begins in component gap 30, further gap breakdown will occur so that conduction in component gap 530 occurs and hence provides a conductive path between electrodes 31 and 32. This action will erect the voltage of capacitor 34 upon the voltage of capacitor 29 to provide a total voltage of $3V_W$ between electrode 36 and ground 53.

Similarly, the transient voltage developed between trigger electrode 38 and ground 53 will provide the required large potential difference between trigger electrode 38 and gap electrode 36 of gap 35 for initiating breakdown of gap component 35. Again the conduction within component gap 35 will institute conduction within component gap 535 and will provide the necessary conductive path to erect the voltage of capacitor 39 upon the already erected voltage $3V_W$ of capacitors 29 and 34 to provide an erected voltage of $4V_W$ across load 40.

Inasmuch as the voltages comprising the now series-connected capacitors 16, 21 and 26 are of the same magnitude as the voltages comprising the now series-connected capacitors 29, 34 and 39, the two series-connected or erected voltages being connected in parallel, the current into load 40 will be doubled. It is of course obvious that one may theoretically have a large number of series-connected (Marx type generator) stages of charged capacitors for voltage multiplication and likewise a large number of parallel connected Marx generators for providing current multiplication. This can be provided substantially without any limit as to the number of capacitors connected in series and without any limit as to the number of marx generators connected in parallel.

It is also obvious that a stage of a Marx generator may be triggered by another preceding connected Marx type stage, by transients developed in the preceding stage. The preceding Marx stage may be triggered by a low energy Marx stage, called a minor Marx stage. It is also obvious that the major Marx stages are so arranged that they will not trigger unless actuated by transients of preceding Marx stages or by transients of preceding minor Marx stages. However, it may be stated generally that in multiple-connected Marx generators, triggering of follow-on stages of a Marx generator may be accomplished by triggering any of the preceding Marx generator stages connected thereto.

It is also obvious that only one of the minor Marx stages need be triggered by an external trigger source to set off the chain of events hereinabove described, although multiple triggering of minor marx stages may be used.

In FIG. 4 there is shown an illustrative embodiment of the invention, emphasizing the adaptability of the present invention in the use of working Marx generators having a plurality of stages, and in combining a plurality of such working Marx generators in parallel, in order to supply increased amounts of energy to a load when the generator is fired. In this latter connection, it will be understood that, for any particular configuration of spark gap switch and the ambient fluid, there is a practical limit to the amount of current flow in the arc, having in mind the desirability of relatively long life of the switch.

More particularly, and with continued reference to FIG. 4, a triggering Marx generator includes capacitors indicated generally at 210, 230, 270 and 290, in alternate electrical relation with spark gap switches indicated generally at 220, 240, 280 and 300. In this triggering Marx generator, switch 220 is a three electrode switch, whereas switches 240, 280 and 300 are two electrode switches. As will be readily understood, an additional number of capacitors and switches may be used, which may generally, but not necessarily, correspond to the number of capacitors and switches in each of the working Marx generators later to be described.

In FIG. 4 there are two working Marx generators shown in parallel relation, with dotted lines extending rightwardly to indicate the possible existence of additional such paralleled working Marx generators if desired.

The various components of the working Marx generator shown closet to the triggering generator just described are numbered with reference characters between 300 and 400, while corresponding components of the next working Marx generator are designated by reference characters 100 greater than those of the first of the working Marx generators.

More particularly, the first of the group of working Marx generators includes capacitors indicated generally at 310, 330, 370 and 390. As in the other forms of the generator, these capacitors are disclosed in alternating relation with spark gap switches indicated generally at 320, 340, 360 and 380. As will be noted, the corresponding components in the next working Marx generator are indicated by corresponding reference numerals in the 400 series.

Means are provided in accordance with the invention to virtually simultaneously trigger the plurality of working Marx generators here shown as including those having components just described, and referred to generally as working Marx generator 305 and working Marx generator 405. Such triggering means include the triggering Marx generator previously described which may be referred to generally as Marx generator 205, together with certain interconnecting circuitry extending between successive stages of the triggering Marx generator and corresponding stages of the working Marx generators. As in the embodiment of the invention previously described, an initial triggering source 200 supplies, through a switch 201, a triggering pulse to the spark gap switch 220, which in turn, when fired, supplies a triggering pulse through an impedance to a bus extending to the various working Marx generators. The pulse in the present illustration appears in line 321 and is fed through an impedance here shown as inductor 322 to a bus 323. From the latter, the triggering pulse is fed through an inductor 324 to the center electrode 325 of spark gap switch 320. Virtually simultaneously, the triggering pulse in bus 323 is fed through inductor 424 to center electrode 425 of switch 420. In order to insure virtual simultaneous firing of the several working Marx generators, it is important that the impedance of the impedances 324 and 424, here shown as inductors, be substantially greater than the impedance of inductor 322. More specifically, as will be noted, the impedances 324 and 424 (of course together with corresponding impedances in successive working Marx generators, when so used) are essentially in parallel; and their paralleled impedance should be greater than the impedance of inductor 322. Thus, if only two working Marx generators are used, then the impedance of 324 and of 424 should be equal, and at least about double the impedance of inductor 322.

As will be readily understood, similar considerations apply to the remaining stages in the present array, the interconnection between the triggering Marx generator and the working Marx generators including busses 343, 383 and 403 and correspondingly connected inductors or other impedances as shown, which need not be described in detail since they duplicate the components just referred to.

In order to further insure virtually simultaneous erection of the several working Marx generators, means may be provided for augmenting the stray capacitances between corresponding stages of adjacent working generators. Such means may include impedance networks interconnecting corresponding spark gap electrodes of the several working generators with elected points in the triggering generator.

Modifications and minor changes from the illustrative embodiments herein disclosed are within the contemplation of the invention, and are intended to be embraced within the scope of the appended claims.

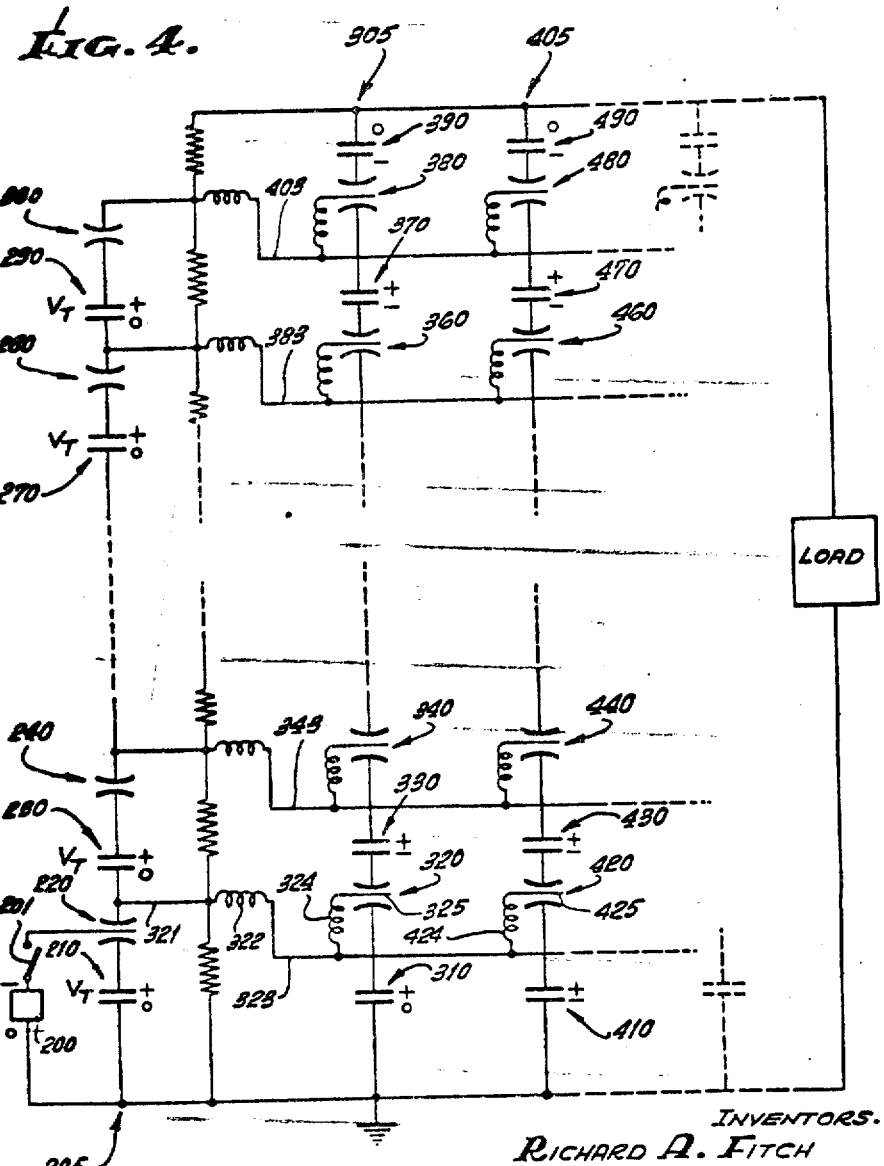

We claim:

1. Marx generator circuitry comprising:
a compact working Marx generator including a multistage stack of capacitors alternating with normally open switches, the interstage stray capacitance being too high to permit an acceptably rapid self-erection rate,
triggering means for erecting said generator including means for closing successive switches at rates substantially more rapid than under conditions of self-erection, said triggering means including a triggering Marx generator having a multi-stage stack of capacitors alternating with normally open switches and characterized by a self-erection rate substantially faster than that of the working generator,
means interconnecting the triggering and working generators whereby working generator switches become conductive in response to successive steps of trigger generator erection, said interconnecting means including inductance means forming, with the capacitance of a capacitor stage of the triggering generator and the stray capacitance of the corresponding switch of the working generator, a series LC resonant circuit,
and means for initiating trigger generator erection.

2. The invention as defined in claim 1 wherein said working generator switches are spark gaps, each having an intermediate electrode to which said interconnecting means is connected.

3. The invention as defined in claim 1 including a second working Marx generator identical to the first named working generator and having its output voltage paralleled therewith,
said interconnecting means further including a bus, said inductance means including a first inductor coupling said bus with a stage of the triggering generator and an inductor coupling said bus with the corresponding stage of each working generator.

4. The invention as defined in claim 3 in which the inductance of said first inductor is no greater than the paralleled inductance of the other inductors.

* * * * *

UNITED STATES PATENT OFFICE
CERTIFICATE OF CORRECTION

Patent No. 3,746,881         Dated  July 17, 1973

Inventor(s)   Richard A. Fitch et al.

It is certified that error appears in the above-identified patent and that said Letters Patent are hereby corrected as shown below:

Insert the third sheet of drawings, containing Fig. 4. The headings of Sheets 1 and 2 of the drawings should be corrected to read -- 3 Sheets --, instead of "2 Sheets.".

Signed and sealed this 5th day of November 1974.

(SEAL)
Attest:

McCOY M. GIBSON JR.
Attesting Officer

C. MARSHALL DANN
Commissioner of Patents

UNITED STATES PATENT OFFICE
CERTIFICATE OF CORRECTION

Patent No. 3,746,881      Dated July 17, 1973

Inventor(s)   Richard A. Fitch et al.      Page - 2

It is certified that error appears in the above-identified patent and that said Letters Patent are hereby corrected as shown below: